United States Patent
Chang

(10) Patent No.: US 11,334,923 B1
(45) Date of Patent: May 17, 2022

(54) METHOD FOR PREDICTING USER OBJECT IN REAL TIME BIDDING AND ADVERTISEMENT SERVER

(71) Applicant: Groundhog Inc., Taipei (TW)

(72) Inventor: Chaochi Chang, Taipei (TW)

(73) Assignee: Groundhog Inc., Taipei (TW)

( * ) Notice: Subject to any disclaimer, the term of this patent is extended or adjusted under 35 U.S.C. 154(b) by 0 days.

(21) Appl. No.: 17/224,130

(22) Filed: Apr. 7, 2021

(51) Int. Cl.
*G06Q 30/02* (2012.01)
*H04M 15/00* (2006.01)
*G06F 16/953* (2019.01)
*G06N 20/00* (2019.01)

(52) U.S. Cl.
CPC ....... *G06Q 30/0275* (2013.01); *G06F 16/953* (2019.01); *G06N 20/00* (2019.01); *G06Q 30/0202* (2013.01); *H04M 15/51* (2013.01)

(58) Field of Classification Search
CPC ............ G06Q 30/0275; G06Q 30/0202; G06F 16/953; G06N 20/00; H04M 15/51
USPC ...................................................... 705/14.71
See application file for complete search history.

(56) References Cited

U.S. PATENT DOCUMENTS

| 2018/0034850 | A1 | 2/2018 | Turgeman |
| 2019/0080363 | A1* | 3/2019 | Acuna Agost ......... G06N 7/005 |
| 2019/0149869 | A1 | 5/2019 | Ray et al. |

FOREIGN PATENT DOCUMENTS

| GB | 2565795 A | * | 2/2019 | ......... G06Q 30/0251 |
| TW | I622941 | | 5/2018 | |

OTHER PUBLICATIONS

Jun Wang, Display Advertising with Real-Time Bidding (RTB) and Behavioural Targeting, 2016 (Year: 2016).*

* cited by examiner

*Primary Examiner* — Tarek Elchanti
(74) *Attorney, Agent, or Firm* — JCIPRNET

(57) ABSTRACT

The disclosure provides a method for predicting a user object in a real time bidding and an advertisement server. The method includes: obtaining telecommunication data, and building a user behavior model based on the telecommunication data by using at least one of machine learning algorithms; receiving a bid request comprising an advertisement identifier which does not have at least one of an identifier field of a certain user object and an advertisement-related identifier from an advertising trading platform; and predicting a first candidate identifier of a first user object corresponding to the bid request according to the advertisement identifier through the user behavior model.

16 Claims, 4 Drawing Sheets

METHOD FOR PREDICTING USER OBJECT IN REAL TIME BIDDING AND ADVERTISEMENT SERVER

BACKGROUND

Technical Field

The present disclosure generally relates to an advertising mechanism, in particular, to a method for predicting a user object in a real time bidding and an advertisement server.

Description of Related Art

Real time Bidding (RTB) facilitates automated buying or selling of digital advertising. During the RTB, a demand-side platform (DSP), which is an organization that connects buy-side organizations (e.g. advertisers and agencies) to Publishers, will receives a bid request. In real-time, numerous advertisers and agencies simultaneously analyze the bid request and then make their bids to purchase the ad exposure opportunity. In certain case, the information contained in the bid request is tied to a randomized persistent identifier such as user ID, iOS IDFA, Android AAID or another randomized identifier created by a particular organization. However, these kinds of identifiers may no longer be specified in the bid request because of privacy concerns.

Therefore, for improving the advertising effect, it is crucial to develop a mechanism for predicting the user corresponding to the bid request.

SUMMARY

Accordingly, the disclosure is directed to a method for predicting a user object in a real time bidding and an advertisement server, which may be used to solve the above problems.

The disclosure provides a method for predicting a user object in a real time bidding, applicable to an advertisement server having a storage circuit and a processor. The method includes: obtaining telecommunication data, and building a user behavior model based on the telecommunication data by using at least one of machine learning algorithms; receiving a bid request comprising an advertisement identifier which does not have at least one of an identifier field of a certain user object and an advertisement-related identifier from an advertising trading platform; and predicting a first candidate identifier of a first user object corresponding to the bid request according to the advertisement identifier through the user behavior model.

The disclosure provides an advertisement server for predicting a user object in a real time bidding. The advertisement server includes a storage circuit and a processor. The storage circuit stores one or more instructions. The processor is coupled to the storage circuit, and is configured to execute the instructions to: obtain telecommunication data, and build a user behavior model based on the telecommunication data by using at least one of machine learning algorithms; receive a bid request comprising an advertisement identifier which does not have at least one of an identifier field of a certain user object and an advertisement-related identifier from an advertising trading platform; and predict a first candidate identifier of a first user object corresponding to the bid request according to the advertisement identifier through the user behavior model.

To make the aforementioned more comprehensible, several embodiments accompanied with drawings are described in detail as follows.

DESCRIPTION OF THE EMBODIMENTS

Figure 1:
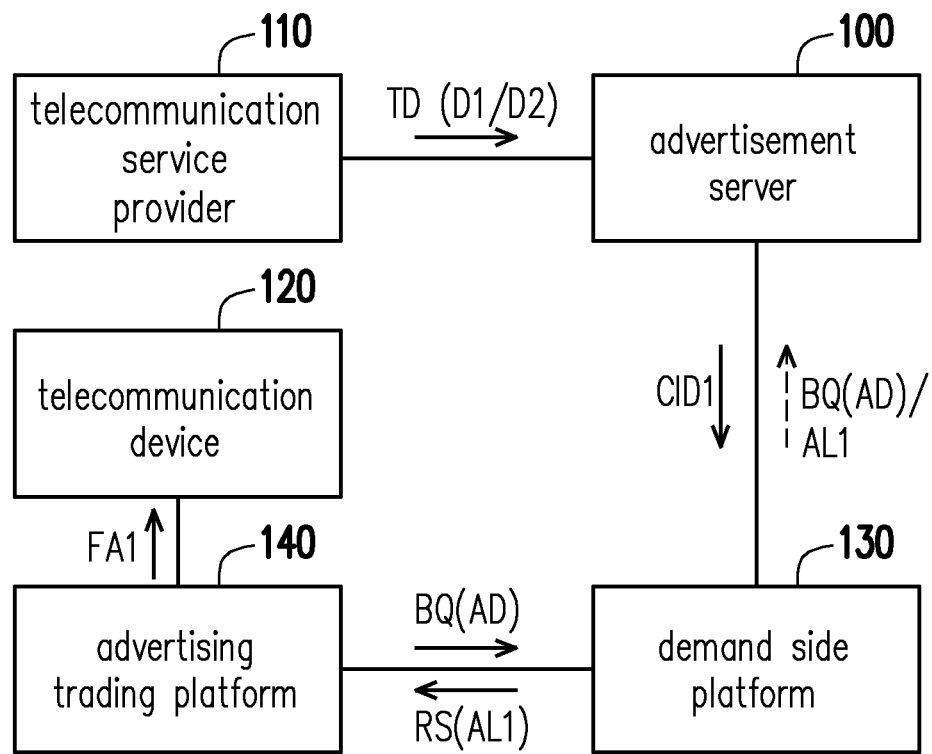
FIG. 1 is a functional diagram illustrating an advertisement system according an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a functional diagram illustrating an advertisement system according an embodiment of the disclosure. See FIG. 1, the advertisement system may include the advertisement server 100, a telecommunication service provider 110, a telecommunication device 120, a demand side platform (DSP) 130 and an advertising trading platform 140.

See FIG. 1, in various embodiments, the DSP 130 may be built in an independent server or the like, or may be built in a server of the telecommunication service provider 110, but the disclosure is not limited thereto. In various embodiments, the advertisement server 100 may be implemented as an independent server or the like. In some embodiments, the advertisement server 100 may be implemented as the DSP built in the server of the telecommunication service provider 110, or may be implemented as the DSP built in the independent server separated from the telecommunication service provider, but the disclosure is not limited thereto. In addition, the advertising trading platform 140 may be a platform where advertisers may bid for performing advertising, such as Ad exchange, but the disclosure is not limited thereto.

Figure 2:
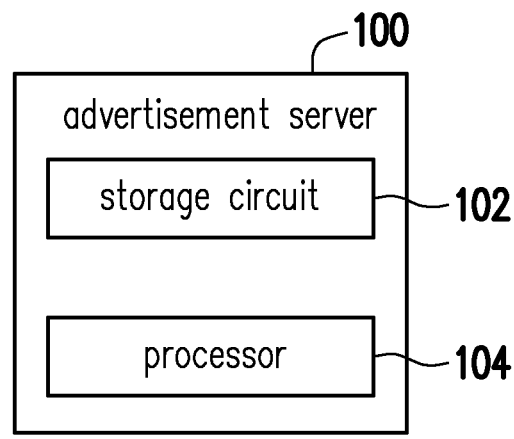
FIG. 2 is a functional diagram illustrating an advertisement server according an embodiment of the disclosure.

FIG. 2 is a functional diagram illustrating an advertisement server according an embodiment of the disclosure. In the present embodiment, the advertisement server 100 may correspond to the advertisement server 100 in the FIG. 1.

In FIG. 2, the advertisement server 100 includes a storage circuit 102 and a processor 104. The storage circuit 102 is, for example, any type of fixed or removable random access memory (RAM), a read-only memory (ROM), a flash memory, a hard disk or other similar device or a combination of these devices to store one or more instructions executable by the processor 104, and the instructions may be loaded into the processor 104.

The processor 104 may be coupled to the storage circuit 104, and the processor 104 is, for example, a central processing unit (CPU), or other programmable general-purpose or specific-purpose microprocessor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, or the like, or a combination thereof, but the disclosure is not limited thereto.

Figure 3:
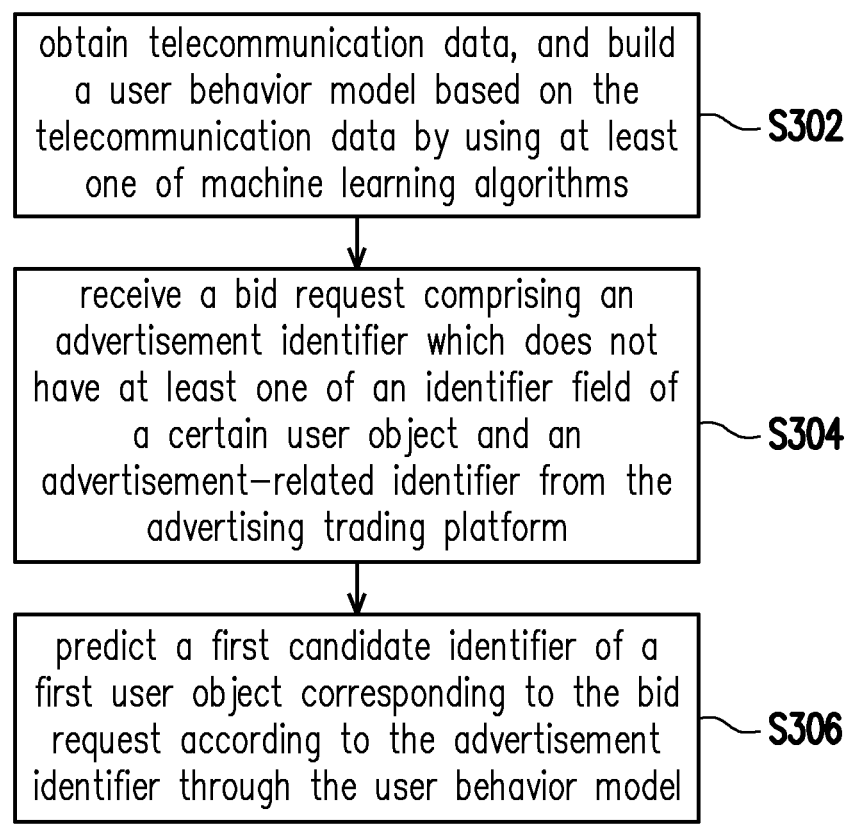
FIG. 3 is a flow chart illustrating a method for predicting a user object in a real time bidding according to an embodiment of the disclosure.

FIG. 3 is a flow chart illustrating a method for predicting a user object in a real time bidding according to an embodiment of the disclosure. Referring to FIG. 1 to FIG. 3, the method of this embodiment is adapted for the above-described advertisement server 100. The following is a detailed description of the method for predicting a user object in a real time bidding in the embodiment of the disclosure with reference to various devices and components of the advertisement server 100.

See FIG. 3, in step S302, the processor 104 may obtain telecommunication data TD, and build a user behavior model based on the telecommunication data TD by using at least one of machine learning algorithms. Specifically, the processor 104 may obtain the telecommunication data TD from the telecommunication service provider 110 or other providers, and the telecommunication data TD may include a domain name server (DNS) query log, a deep packet inspection (DPI) data, a user IP address allocation record, a user location data and/or a user device information, but the disclosure is not limited thereto.

Usually, when visiting a website, the telecommunication device will first find out the IP address of the target website through DNS query. Therefore, it is possible to deduce the network usage behavior of some users of the telecommunication device according to the DNS query log. DNS query log records when a certain source IP address queries the Domain Name Server for a destination IP address corresponding to a certain domain name. For example, DNS query log may record the following information: (1) the timestamp; (2) the source IP address; (3) the domain name; (4) the destination IP address.

The DPI data records the network usage behavior of users. In general, the DPI data stored in the telecommunication service provider 110 is unavailable. However, in the case where the advertisement server 100 is implemented as the DSP built in the server of the telecommunication service provider 110, the DPI data become available for the advertisement server 100, but the disclosure is not limited thereto. For example, the DPI data may record the following information: (1) the user identifier (e.g. the Mobile Subscriber ISDN (MSISDN) or the hashed MSISDN); (2) the source IP address (e.g. the private IP address or the public IP address); (3) the port; (4) the domain name or the destination IP address; (5) the start time; (6) the end time.

The user IP address allocation record records which IP address (or the IP address and the port) the user is allocated to during what time period. This information may be available in real time (e.g. via API) or follow-up records depending on the situation of the telecommunication service provider 110. For example, the user IP address allocation record may record the following information: (1) the user ID (e.g. the MSISDN or the hashed MSISDN); (2) the private IP; (3) the public IP; (4) the port; (5) the start time; (6) the end time. The time period between the start time and the end time is an allocation period for a certain user corresponding to the user ID.

In addition, the user location data and the user device information may also be recorded. For example, the user location data may record a location information of the user in a certain time, and the user device information may record International Mobile Equipment Identity (IMEI) code of the user's telecommunication device.

In some embodiments, the processor 104 may build (train) the user behavior model by using at least one of machine learning algorithms. For example, the machine learning algorithms may include decision tree, decision table, Bayes Networks, support vector machines (SVM), sequential minimal optimization (SMO), k-NN, multilayer perceptron neural network (MLP), random forest modeling device, cluster modeling device, K mean cluster modeling device and other neural network algorithms, but the disclosure is not limited thereto.

Figure 4:
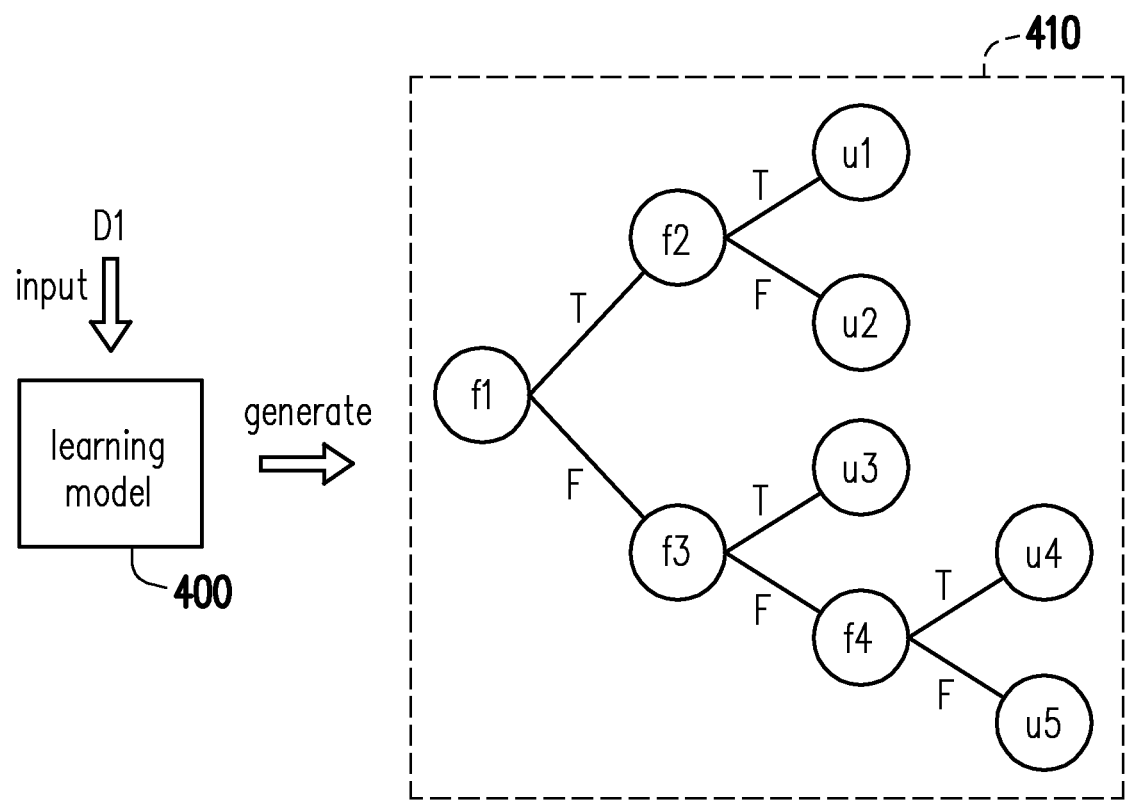
FIG. 4 is a schematic diagram illustrating the user behavior model built based on the telecommunication data according to an embodiment of the disclosure.

FIG. 4 is a schematic diagram illustrating the user behavior model built based on the telecommunication data according to an embodiment of the disclosure. In various embodiments, the method of FIG. 3 may be implemented in many ways, which would be discussed in the following first embodiment.

In the first embodiment, assuming that the telecommunication data TD includes first DPI data D1, the format of the first DPI data D1 may be exemplarily shown in the following Table 1. In table 1, the first DPI data includes the user identifier (user ID, e.g. the International Mobile Subscriber Identity (IMSI) or the MSISDN), the source IP address (source IP), the port, the domain name, the start time, and the end time.

TABLE 1

| User ID | Source IP | Port | Domain name | Start time | End time |
|---|---|---|---|---|---|
| (IMSI/MSISDN) | (IP address) | (port) | (domain) | YYYY:MM:DD:mm:SS | YYYY:MM:DD:mm:SS |

With reference to FIG. 4, specifically, the plurality of data of the first DPI data D1 are input to a learning model 400. The learning model is, for example, an algorithm containing a plurality of formulas. The learning model can derive a plurality of feature rules according to the inputted plurality of data of the first DPI data D1. Also, the learning model can generate a feature set corresponding to user identifier as recorded by the following Table 2 through to the plurality of data of the first DPI data D1, and generate a corresponding user behavior model such as a decision tree 410.

TABLE 2

| User ID | f1 | f2 | f3 | f4 |
|---|---|---|---|---|
| u1 | T | T | F | T |
| u2 | T | F | F | T |
| u3 | F | T | T | F |
| u4 | F | T | F | T |
| u5 | F | T | F | F |

In other word, the processor 104 can generate (or learn) the corresponding user behavior model through the formulas of the learning model, the plurality of data of the first DPI data D1, and the feature set corresponding to the user identifier, but the disclosure is not limited thereto. After the user behavior model is built (trained), the processor 104 will record the built user behavior model. Later, the user object of the real time bidding may be determined by using the built user behavior model.

As illustrated in FIG. 4, the user behavior model corresponding to the first DPI data D1 is a decision tree architecture. The decision tree 410 has a plurality of layers, and a top layer (a start layer) only includes one start node, which is configured to indicate a first feature value f1 of the feature set. Next, according to the Boolean value (True or False, T or F) of the first feature value f1 corresponding to the start node, the start node can be connected to two nodes of a second layer (sub-nodes of the start layer), and the two nodes respectively correspond to a second feature value f2 and a third feature value of the feature set. In the present embodiment, in response to the Boolean value of the first feature value f1 is T, the corresponding start node would be connected to the node corresponding to the second feature value f2, and in response to the Boolean value of the second feature value f1 is F, the corresponding start node would be connected to the node corresponding to the third feature value f3. The above process repeats until all of the feature values f1 to f4 of the feature set and the user identifier u1 to u5 correspond to all nodes of the decision tree 410. It should be noted that, a plurality of end nodes of the generated decision tree 410 are configured to indicate the user identifier, and the end nodes do not have any sub-node.

It should be noted that, although the above user behavior model is built according to the DPI data by using the decision tree, the processor 104 may also build the user behavior model by using others machine learning algorithms according to different telecommunication data TD as mentioned above. Also, the processor 104 may also build the user behavior model according to a combination of different telecommunication data TD, but the disclosure is not limited thereto. For instance, the telecommunication data TD may include DNS query log and the user IP address allocation records. The format of the DNS query log in combination with the user IP address allocation records may be exemplarily shown in the following Table 3. In table 3, the combination of the DNS query log and the user IP address allocation records includes the timestamp, the source/public IP address (source/public IP), the private IP address (private IP), the user ID (user ID, e.g. the IMSI or the MSISDN), the domain name, and the destination IP address (destination IP). After the user behavior model is built according to the DNS query log in combination with the user IP address allocation records by using the decision tree, the end nodes of the user behavior model may be configured to indicate the user ID, but the disclosure is not limited thereto.

device is the certain user object, which means that the processor 104 does not know the bid request BQ is corresponding to the telecommunication device 120 and/or the user using the telecommunication device 120. Therefore, the processor 104 may perform the following step S306 to predict a user object corresponding to the advertisement identifier AD of the bid request BQ.

Referring to FIG. 1, in the first embodiment, the bid request BQ may be a real time bidding (RTB) request created based on an OpenRTB Specification by the advertising trading platform 140. According to the OpenRTB Specification, the bid request BQ may include a time identifier (e.g. timestamp), an exposure source identifier (e.g. application or site page), a device identifier (e.g. the type, the make, the model, the OS, the OS version, the IP/IPv6 address, the identifier for Advertisers (IDFA/AAID), the location, the user agent of the device), and/or a user identifier (e.g. a user identifier) in general, but the disclosure is not limited thereto.

Since the time identifier, the exposure source identifier, the device identifier, and the user identifier may be used to provide advertisement to the certain telecommunication device, the time identifier, the exposure source identifier, the device identifier, and the user identifier may be generally referred to as the advertising identifier AD in the bid request BQ, but the disclosure is not limited thereto. In other embodiment, the bid request BQ may include other advertisement-related identifiers that could be used by the operating system provider for representing the certain telecommunication device in the bid request BQ, and these advertisement-related identifiers may be referred to as the advertising identifier AD as well, but the disclosure is not limited thereto.

However, due to privacy concerns, the bid request BQ may no longer include an identifier field of a user object, and the identifier field of the user object in the bid request BQ may be referred to as the device identifier of the certain telecommunication device or the user identifier corresponding to the certain telecommunication device. In other embodiment, other advertisement-related identifiers may not be included in the bid request BQ as well. For example, the advertisement-related identifiers in the bid request BQ may be an identifier for advertisers (IDFA) of the certain telecommunication device, an android advertising identifier (AAID) of the certain telecommunication device, or an identifier for vendor (IDFV), but the disclosure is not limited

TABLE 3

| Timestamp | Source/Public IP | Private IP | User ID | Domain name | Destination IP |
|---|---|---|---|---|---|
| YYYY:MM:DD:mm:SS | (IP address) | (IP address) | (IMSI/MSISDN) | (domain) | (IP address) |

Referring back to FIG. 3, in step S304, the processor 104 may receive a bid request BQ comprising an advertisement identifier AD which does not have at least one of an identifier field of a certain user object and an advertisement-related identifier from the advertising trading platform 140. For better understanding, the certain user object would be assumed to be the user using a certain telecommunication device, and the certain telecommunication device would be assumed to be a first telecommunication device, i.e., the telecommunication device 120. However, in the phase where the processor 104 receives the bid request BQ, the processor 104 does not know that the certain telecommunication device is the telecommunication device 120 and does not know the user using the certain telecommunication thereto. Therefore, with the advertisement identifier AD which does not have the identifier field of the certain user object or the advertisement-related identifier, it will be difficult for the advertisement server 100 (or the demand side platform 130) to know the certain telecommunication device and the certain user object corresponding to the bid request BQ.

In step S306, the processor 104 may predict a first candidate identifier CID1 of a first user object corresponding to the bid request BQ according to the advertisement identifier AD through the user behavior model. In the first embodiment, the processor 104 may receive the bid request BQ, and input the advertisement identifier AD to the user behavior model to obtain the first candidate identifier CID1 of the first user object.

For instance, with reference to FIG. 4, assuming that the behavior model corresponding to the first DPI data D1 is the decision tree 410 shown by FIG. 4. The processor 104 reads the decision tree 410 corresponding to the advertisement identifier AD, and obtains the first candidate identifier CID1 of the first user object by inputting the advertisement identifier AD to the decision tree 410. That is to say, the processor 104 determines that the first candidate identifier CID1 of the first user object may be at least one of the user identifiers corresponding to the decision tree 410.

On the other hand, in the first embodiment, the method of the disclosure may further filter the first candidate identifier CID1 of the first user object user by using the IP address included in the advertisement identifier AD. In detail, the processor 104 may predict a plurality of the first candidate identifiers CID1 of first user objects in the step S306. Therefore, The processor 104 can compare the IP address included in the advertisement identifier AD with the IP address corresponding to each of the first candidate identifiers CID1 of the first user objects, wherein the IP address corresponding to each of the first candidate identifier CID1 of the first user objects can be obtained from the telecommunication data TD according to the first candidate identifier CID1. It should be noted that, the first candidate identifier may be different identifiers related to the first user object, such as the user identifier, the device identifier, the source IP or other identifiers, when the user behavior model is built/trained by different telecommunication data TD.

As could be understood in the above, in the first embodiment, the method of the disclosure may find out the candidate identifier of the user object which is possible to present the certain user object corresponding to the bid request. Further, the method of the disclosure also provides a method for improving the accuracy of predicting the certain user object in the real time bidding, which would be introduced in the following second embodiment.

Figure 5:
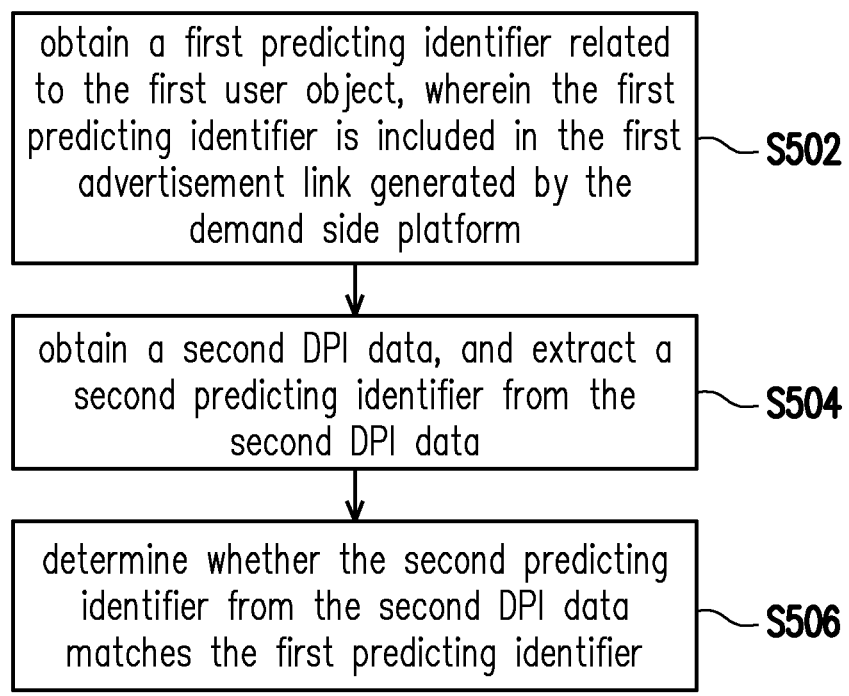
FIG. 5 is a flow chart illustrating a method for improving the accuracy of predicting the certain user object in the real time bidding according to an embodiment of the disclosure.

FIG. 5 is a flow chart illustrating a method for improving the accuracy of predicting the certain user object in the real time bidding according to an embodiment of the disclosure. The method of this embodiment may be executed by the advertisement server 100 in FIG. 1, and the details of each in FIG. 4 will be described below with the components shown in FIGS. 1 and 2.

Firstly, the processor 104 may transmit the first candidate identifier CID1 of the first user object to the demand side platform 130. Then, the demand side platform 130 may determine whether to transmit a bid response RS to the advertising trading platform 140 according to the first candidate identifier CID1 of the first user object, wherein the bid response RS may include the first advertisement link AL1. In response to a determination for transmitting the bid response RS to the advertising trading platform 140, the demand side platform 130 generates the first advertisement link AL1 related to the first user object, wherein the first advertisement link AL1 includes a first predicting identifier related to the first user object. Then, the demand side platform 130 may transmit the bid response RS to the advertising trading platform 140, and further transmit the first advertisement link AL1 to the advertisement server 100. The details about how the first advertisement link AL1 is included in the bid response RS may be referred to the specification of Ad exchange, which would not be provided herein.

After the advertising trading platform 140 receives the bid response RS from the demand side platform 130, the advertising trading platform 140 may determine whether the demand side platform 130 has won the opportunity to provide a first advertisement FA1 to a telecommunication device. The determination procedure of the advertising trading platform 140 may be referred to related documents, such as the specification of Ad exchange, but the disclosure is not limited thereto.

In the second embodiment, assuming that the advertising trading platform 140 determines that the demand side platform 130 has won the opportunity to provide the first advertisement FA1 to the telecommunication device, the advertising trading platform 140 may generate the first advertisement FA1 based on the advertisement link AL1 and push the first advertisement to the certain telecommunication device, i.e., the telecommunication device 120. In this case, the first advertisement FA1 may be shown in some advertisement fields in the user interface of the certain telecommunication device for the certain user object to see.

In the second embodiment, if the first advertisement FA is shown or triggered (e.g., clicked by the user (referred to as the certain user) of the telecommunication device 120), the telecommunication service provider 110 would correspondingly update the first DPI data to generate a second DPI data D2.

Referring to FIG. 5, in step S502 the processor 104 may obtain a first predicting identifier related to the first user object, wherein the first predicting identifier is included in the first advertisement link AL1 generated by the demand side platform 130. Then, in step S504, the processor 104 may obtain the second DPI data D2, and extract a second predicting identifier from the second DPI data D2. Specifically, the processor 104 may obtain the second DPI data D2 from the telecommunication service provider 110 or other providers.

Assuming that the first advertisement link AL1 was implemented as "https://predictid1.ghtinc.com/", the format of the second DPI data D2 may be exemplarily shown in the following Table 4.

TABLE 4

| User ID | Source IP | Port | Domain name | Start time | End time |
|---|---|---|---|---|---|
| (IMSI/MSISDN) | (IP address) | (port) | predictid1.ghtinc.com | YYYY:MM:DD:mm:SS | YYYY:MM:DD:mm:SS |

Therefore, in step S504, the processor 104 may extract the second predicting identifier from the advertisement link AL1 in the second DPI data D2. For example, the processor 104 may extract "predictid1" from the advertisement link AL1 in the second DPI data D2 as the second predicting identifier.

Referring back to FIG. 5, in step S506, the processor 104 may determine whether the second predicting identifier from the second DPI data D2 matches the first predicting identifier. In response to determining the second predicting identifier from the second DPI data D2 matches the first predicting identifier, the processor 104 may determine the first user object matches the certain user object of the bid request BQ. In response to determining the second predicting identifier from the second DPI data D2 does not match the first predicting identifier, the processor 104 may determine the first user object does not match the certain user object of the bid request BQ.

In addition, the processor 104 may update at least one parameter of the user behavior model related to the first candidate identifier of the first user object based on a determination result of determining whether the second predicting identifier from the second DPI data D2 matches the first predicting identifier. In response to the determination result indicates that the first user object matches the certain user object, the processor 104 may update at least one parameter of the user behavior model related to the first candidate identifier CID1 of the first user object. For instance, in the second embodiment, the processor 104 may increase a weight related to the first candidate identifier of the first user object to update (or train) at least part of the parameters of the user behavior model for improving the accuracy of predicting the certain user object in the real time bidding. For instance, the updated parameters may be the parameters in the learning model, but the disclosure is not limited thereto.

On the other hand, in response to the determination result indicates that the first user object does not match the certain user object, the processor 104 may update at least one parameter of the user behavior model related to the first candidate identifier CID1 of the first user object. For instance, in the second embodiment, the processor 104 may decrease a weight related to the first candidate identifier of the first user object to update (or train) at least part of the parameters of the user behavior model for improving the accuracy of predicting the certain user object in the real time bidding.

As mentioned in the above, in response to determining that a user object of a telecommunication device has seen the specific advertisement, the processor 104 may obtain the second predicting identifier corresponding to the telecommunication device based on the above association. Specifically, since the processor 104 has determined that the second predicting identifier is matched with the first predicting identifier, the processor 104 may determine the predicting result of the user behavior model is correct. Therefore, the predicting result of the user behavior model may be used to update the parameter of the user behavior model. On the other hand, in response to determining that there is no second predicting identifier matched with the first predicting identifier, the processor 104 may determine the predicting result of the user behavior model is incorrect. The predicting result of the user behavior model may also be used to update the parameter of the user behavior model.

In summary, the method of the disclosure may train a user behavior model, and predict a possible user object corresponding to the bid request by using the user behavior model. According, even if the identifier (e.g. user ID, iOS IDFA, Android AAID), is not included in the bid request, a possible user object corresponding to the bid request may still be obtained. In addition, the method of the disclosure may further update the user behavior model according to the predicting result. Accordingly, the accuracy of predicting the certain user object in the real time bidding may be increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for predicting a user object in a real time bidding (RTB), applicable to an advertisement server having a storage circuit and a processor, the method comprising:
   obtaining telecommunication data provided by a telecommunication service provider, and building a user behavior model based on the telecommunication data by using at least one of machine learning algorithms;
   receiving a bid request comprising an advertisement identifier which does not have at least one of an identifier field of a certain user object and an advertisement-related identifier from an advertising trading platform;
   predicting a first candidate identifier of a first user object corresponding to the bid request according to the advertisement identifier through the user behavior model, and transmitting the first candidate identifier to a demand side platform for determining whether to transmit a bid response to the advertising trading platform;
   in response to a determination for transmitting the bid response to the advertising trading platform, receiving a first advertisement link related to the first user object generated by the demand side platform from the demand side platform, wherein the first advertisement link comprises a first predicting identifier related to the first user object;
   obtaining the first predicting identifier from the first advertisement link;
   obtaining a deep packet inspection (DPI) data provided by the telecommunication service, and extracting a second predicting identifier from a second advertisement link in the DPI data; and
   in response to determining the second predicting identifier matches the first predicting identifier, determining the first user object matches the certain user object of the bid request and increasing a weight related to the first candidate identifier of the first user object in the user behavior model to update at least one parameter of the user behavior model.

2. The method according to claim 1, wherein the telecommunication data comprises at least one of a domain name server (DNS) query log, a deep packet inspection (DPI) data, a user IP address allocation record, a user location data and a user device information.

3. The method according to claim 1, wherein the telecommunication data is obtained from the telecommunication service provider.

4. The method according to claim 1, wherein the identifier field of the certain user object comprises a device identifier of a certain telecommunication device and a user identifier corresponding to the certain telecommunication device.

5. The method according to claim 1, wherein the advertisement-related identifier comprises an identifier for advertisers (IDFA) of a certain telecommunication device, an android advertising identifier (AAID) of the certain telecommunication device, or an identifier for vendor (IDFV).

6. The method according to claim 1, wherein the bid request is a real time bidding (RTB) request created based on an OpenRTB Specification.

7. The method according to claim 1, wherein the advertisement identifier comprises an IP address, and the method further comprising:

filtering the first candidate identifier of the first user object user by using the IP address comprised in the advertisement identifier.

8. The method according to claim 1, wherein the DPI is obtained from a telecommunication service provider.

9. An advertisement server for predicting a user object in a real time bidding (RTB), comprising:
- a storage circuit, storing one or more instructions; and
- a processor, coupled to the storage circuit, configured to execute the instructions to:
- obtain telecommunication data provided by a telecommunication service provider, and build a user behavior model based on the telecommunication data by using at least one of machine learning algorithms;
- receive a bid request comprising an advertisement identifier which does not have at least one of an identifier field of a certain user object and an advertisement-related identifier from an advertising trading platform;
- predict a first candidate identifier of a first user object corresponding to the bid request according to the advertisement identifier through the user behavior model, and transmit the first candidate identifier to a demand side platform for determining whether to transmit a bid response to the advertising trading platform;
- in response to a determination for transmitting the bid response to the advertising trading platform, receive a first advertisement link related to the first user object generated by the demand side platform from the demand side platform, wherein the first advertisement link comprises a first predicting identifier related to the first user object;
- obtain the first predicting identifier from the first advertisement link;
- obtain a deep packet inspection (DPI) data provided by the telecommunication service, and extract a second predicting identifier from a second advertisement link in the DPI data; and
- in response to determining the second predicting identifier matches the first predicting identifier, determine the first user object matches the certain user object of the bid request and increase a weight related to the first candidate identifier of the first user object in the user behavior model to update at least one parameter of the user behavior model.

10. The advertisement server according to claim 9, wherein the telecommunication data comprises at least one of a domain name server (DNS) query log, a deep packet inspection (DPI) data, a user IP address allocation record, a user location data and a user device information.

11. The advertisement server according to claim 9, wherein the telecommunication data is obtained from the telecommunication service provider.

12. The advertisement server according to claim 9, wherein the identifier field of the certain user object comprises a device identifier of a certain telecommunication device and a user identifier corresponding to the certain telecommunication device.

13. The advertisement server according to claim 9, wherein the advertisement-related identifier comprises an identifier for advertisers (IDFA) of a certain telecommunication device, an android advertising identifier (AAID) of the certain telecommunication device, or an identifier for vendor (IDFV).

14. The advertisement server according to claim 9, wherein the bid request is a real time bidding (RTB) request created based on an OpenRTB Specification.

15. The advertisement server according to claim 9, wherein the advertisement identifier comprises an IP address, and the processor further configured to filter the first candidate identifier of the first user object user by using the IP address comprised in the advertisement identifier.

16. The advertisement server according to claim 9, wherein the DPI is obtained from a telecommunication service provider.

* * * * *